United States Patent
Driscoll et al.

(10) Patent No.: US 6,577,627 B1
(45) Date of Patent: Jun. 10, 2003

(54) SERVICE SELECTION ON IP ACCESS NETWORKS

(75) Inventors: Richard J Driscoll, Totnes (GB); Philip N Johnson, Paignton (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/342,362

(22) Filed: Jun. 29, 1999

(51) Int. Cl.[7] ............................................. H04L 12/128
(52) U.S. Cl. ..................................... 370/389; 370/399
(58) Field of Search .................... 370/389, 397, 370/399, 400, 401; 455/436; 709/238, 206

(56) References Cited

U.S. PATENT DOCUMENTS

| | | | | |
|---|---|---|---|---|
| 6,070,076 A | * | 5/2000 | Valentine | 455/436 |
| 6,101,549 A | * | 8/2000 | Baugher et al. | 709/238 |
| 6,157,647 A | * | 12/2000 | Husak | 370/401 |
| 6,230,188 B1 | * | 5/2001 | Marcus | 709/206 |
| 6,236,660 B1 | * | 5/2001 | Heuer | 370/399 |
| 6,470,382 B1 | * | 10/2002 | Wang et al. | 709/220 |

FOREIGN PATENT DOCUMENTS

| | | | |
|---|---|---|---|
| CA | 2213984 | | 2/1998 |
| WO | WO 9838761 A | * | 9/1998 |
| WO | WO98/43446 | | 10/1998 |

* cited by examiner

*Primary Examiner*—Salvatore Cangialosi
(74) *Attorney, Agent, or Firm*—Barnes & Thornburg

(57) ABSTRACT

Traditionally a user has accessed an Internet Service Provider (ISP) using a circuit switched access network such as the Public Switched Telephone Network (PSTN). This advantage is lost in current packet switched access networks where there is no mechanism for a user to select a particular ISP in the access network. The present invention provides a method for a user in a packet switched access network to select a connection facility to a second network, the method comprising, the user prepending the access network address of the connection facility to each data packet sent across the access network by the user, and the access network connection removing the prepended address from each packet prior to sending the packets on to the second network.

3 Claims, 2 Drawing Sheets

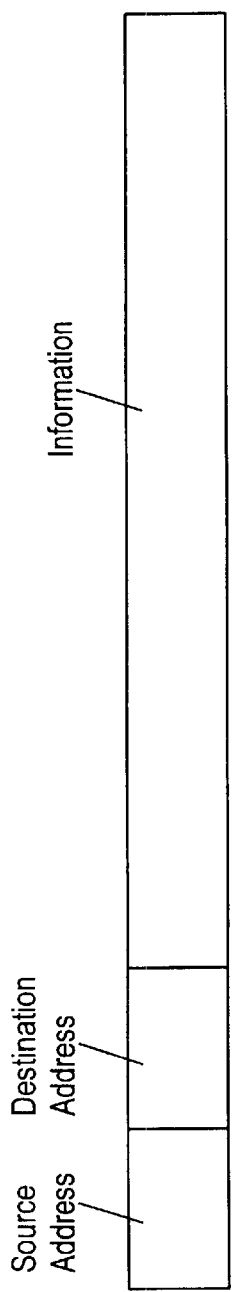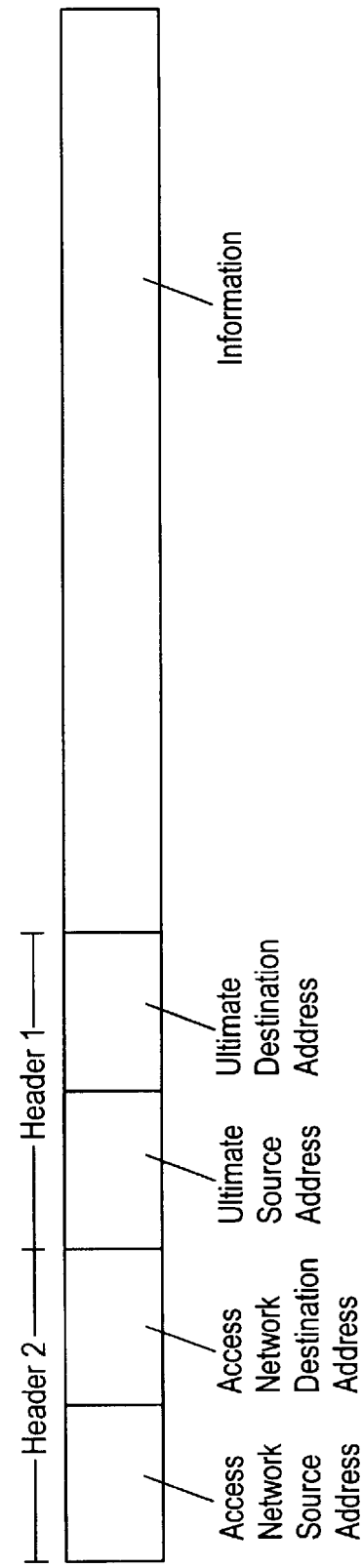

SERVICE SELECTION ON IP ACCESS NETWORKS

FIELD OF THE INVENTION

The present invention relates to access networks.

BACKGROUND OF THE INVENTION

Traditionally a user has accessed an Internet service provider (ISP) using a circuit switched access network for example the public switch telephone network (PSTN). In this arrangement the user can select an ISP of choice by dialling the appropriate telephone number; a dedicated physical circuit is then set up via the phone lines and central office switching equipment between the users modem and the ISP.

Recently alternative access networks have become available in which packet switching is used. In a packet switched access network, data to be sent or received is broken down into packets, each of which includes the destination address and the packet sequence. The packets are then transmitted over the network taking any number of routes to reach their destination. At the destination the packets are received and the data retrieved by assembling the packet data in its proper sequence. While packets can take different routes to reach their final destination, a virtual circuit as opposed to a switched circuit, is said to have been formed across the access network between sender and receiver. Examples of packet switched access network enabling technology includes asymmetric digital subscriber line (ADSL), cable modem, the third generation mobile system known as Universal Mobile Telecommunication System (UMTS), as well as various fixed wireless data networks technology.

Many packet switched access networks are connected to other networks such as the Internet for example by a single connection facility, for example an ISP. It has not been possible for a user to select one facility or ISP over another in packet switched access networks, as has been possible with traditional circuit switched access networks.

SUMMARY OF THE INVENTION

It is an object of the present invention to provide a method of selecting in a packet switched access network an interface to another network.

It is a further object of the present invention to provide a method of selecting in a packet switched access network an ISP to the Internet. In a first aspect the present invention provides a method for a user in a packet switched access network to select a connection facility to a second network, the method comprising:

the user prepending the access network address of said connection to each data packet sent onto the access network by said user;

the access network connection removing said prepended address from each said packet prior to sending said packets onto said second network.

Preferably said second network is the Internet, said access network connection is an Internet Service Provider (ISP), and said data packets are IP packets.

Preferably said access network and said second network use the same data packet header format.

In a second aspect the present invention provides a method of transmitting packets across an access network from a user to a connection facility to a second network, the method comprising:

accepting from said user of said access network data packets prepended with the access network address of said connection facility; and forwarding said packets to said connection facility.

Preferably said second network is the Internet, said connection facility is an Internet Service Provider (ISP), and said data packets are IP packets.

Preferably said access network and said second network use the same data packet header format.

In a third aspect the present invention provides a method of transmitting packets across an access network from a connection facility to a second network to a user of said access network, the method comprising:

accepting from said facility data packets prepended with the access network address of said user; and forwarding said packets to said user.

In a fourth aspect the present invention provides a signal comprising an access network data packet for transporting between a user of said network and a destination in a second network to which said access network is connected, said packet comprising an access network address corresponding to a connection facility between said networks.

In a further aspect the present invention provides access network equipment comprising:

means for accepting from a user of said access network data packets prepended with the access network address of a connection facility between said access network and a second network; and means for forwarding said packets to said connection facility.

In a still further aspect the present invention provides access network equipment comprising:

means for accepting from a connection facility between said access network and a second network data packets prepended with the access network address of a user of said access network; and means for forwarding said packets to said user.

In a yet further aspect the present invention provides connection facility equipment for connecting an access network with a second network, the equipment comprising:

means for accepting data packets from said access network having the access network address of said connection;

means for removing said address and forwarding said packets onto said second network.

In another aspect the present invention provides connection facility equipment for connecting an access network with a second network, the equipment comprising:

means for accepting data packets from said second network;

means for prepending the address of an access network user to said packet and forwarding said packets onto said access network.

DESCRIPTION OF THE DRAWINGS

In order that a greater understanding of the invention can be obtained, embodiments of the invention will now be described with reference to the accompanying drawings, by way of example only and without intending to be limiting, in which:

FIG. 3 shows the format of a standard Internet protocol (IP) packet in simplified form;

FIG. 4 shows the format of a modified packet according to the invention.

DETAILED DESCRIPTION

Figure 1:
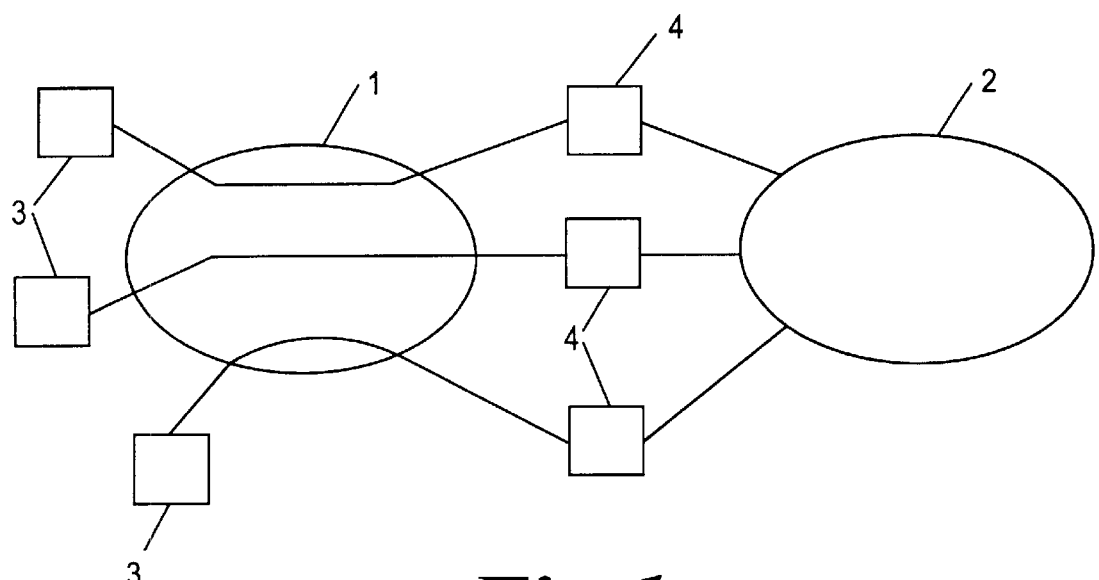
FIG. 1 shows a prior art circuit switched access network providing access to the Internet.

FIG. 1 shows a typical circuit switched access network 1 in which a number of users 3 can access a second network such as the Internet 2 via a number of connection facilities such as ISPs 4. Each user 3 chooses an ISP 4 for connection to the Internet 2 based on factors such as price and level of service for example. An ISP 4 is chosen by dialling that ISPs phone number whereupon a physical connection is formed across the access network between the users 3 and the selected ISP 4 for the duration of the users requirement for Internet access. Typically this physical connection is only utilized for a small fraction of the time the user 3 is connected to the Internet, during the "bursty" nature of traffic during activities such as web browsing.

Figure 2:
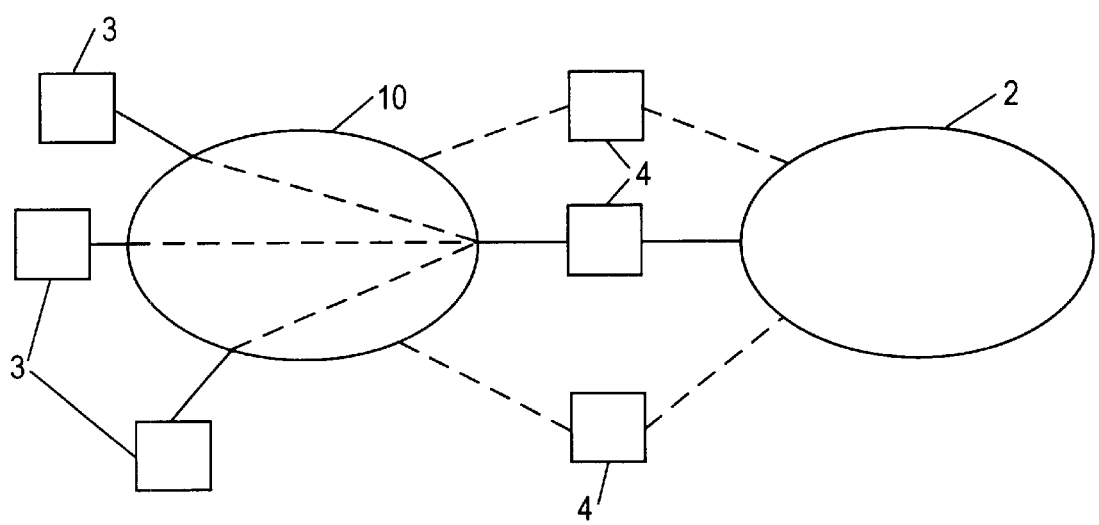
FIG. 2 shows a packet switched access network providing access to the Internet.

A packet switched access network 10 is shown in FIG. 2 and can be arranged such that a user is always connected to the access network 10 and hence the Internet 2 via an ISP 4. In a packet switched access network 10, data is transferred between the user 3 and Internet 2 on an as required basis, as there is no need to form dedicated physical connections. Instead a virtual connection is formed across the access network 10 between each user 3 and the ISP 4 serving the access network.

Typically the ISP or ISPs 4 on a packet switched access network 10 are provided by the access network operator as there has been no way of selecting which ISP 4 a packet sent between a user 3 and the Internet 10 uses. This is because the only destination address in a standard IP packet generated by a user 3 is that of the ultimate destination on the Internet, not that of the ISP of choice. The format of IP packets is shown in simplified form in FIG. 3. The packet contains user information such as requesting download of a new web page for example, as well as a header including information on the users source address, and the destination address of the ultimate destination on the Internet. This header is used for routing the packet from source to destination. Routing through the access network is based on internal network routing protocols and mechanisms and it is therefore not possible to select a particular ISP 4 for connection to the Internet. The user's equipment will typically be given the IP address of a default router or gateway at configuration time. This will be the IP address of the ISP. The effect of this is that all packets not destined for the user's own equipment will be sent to the default router, in other words the ISP.

The invention provides a method of selecting an ISP 4 of choice within the packet switched access network 10 by treating the standard IP packet of FIG. 3 as information which is encapsulated within a larger packet prepended with a second header as shown in FIG. 4. The second header comprises the source address of the sender in the access network 10, as well as the destination address within the access network 10. For example, the source address in the addition header (header 2) may be that of a user 3 and the destination address that of a particular ISP 4, allowing the use of 3 to select an ISP 4 of choice. Similarly the source address may be that of the selected ISP 4 which is forwarding an IP packet to the selecting user 3 whose address is contained in the destination address field of header 2.

Packets sent from a source on the Internet to the user's terminal are first directed to the user's ISP as defined in the network routing tables, which are updated dynamically.

The user terminal 3 builds a standard IP packet with his address as the source address and that of the ultimate Internet destination as the destination address. Before launching the packet onto the access network 10 however, a second header is prepended to the packet and in this header the destination address is that of the selected ISP 4 on the access network 10. The source address in the second header will again be that of the user 3.

When the modified packet reaches the selected ISP 4, the ISP 4 removes the outer header (header 2) exposing the inner header (header 1), the exposed IP packet then enters the Internet in a format just like that of any other Internet packets.

Alternatively the header 2 processing may be done in a custom interface unit between the ISP 4 and the access network 10.

The IP packet (without header 2) is then routed through the Internet to the ultimate destination using the destination address in header 1. While there is no need for the source address in header 2, it is preferred that header 2 is a standard IP type. This enables the use of standard software (eg PPTP—see below) that can be used in the user's equipment to look after header 2.

This also advantageously allows a network (say an Ethernet) at the user's end attached to the user's terminal that is connected to the access network. Also on the Ethernet there could be another or second computer (not shown) which can be configured to set the user's terminal 3 as the default router so any Internet bound packets from the second computer are to terminal 3 which then prepends header 2 and sends the packets out on the access network to the ISP. In this case the source address in header 2 would be that of the second computer but the source address in header 1 would be that of the user's terminal 3.

The user's terminal 3 can derive which ISP has sent packets from the header 2 source address.

In the reverse direction the process is similar but in this case header 2 is prepended by the ISP 4. The ISP 4 adds the users address as the header 2 destination and the ISP 4 address as the header 2 source. The users terminal 3 then removes header 2 before treating the remainder of the packets (a standard IP packet) in the normal way.

Preferably the user 3 utilizes standard off the shelf software to prepend and remove header 2 information on the standard IP packet.

Preferably the software is Microsoft's™ point-to-point-tunnelling-protocol (PPTP) package which is easily configured from its original virtual private networks function to provide the above access network ISP selection function. Alternatively layer 2 tunnelling protocol (L2TP) software can be configured to provide the inventive method described above.

While the invention has been described with respect to a switched packet access network 10 and the Internet 2, the invention could also be applied to connections between an access network 10 and other types of IP networks—for example Corporate Intranets or other private IP networks.

The invention has been described with reference to a preferred embodiment thereof. Alterations in modification would be obvious to a person skilled in the art are incorporated within the scope hereof.

What is claimed is:

1. A method for a user in an Internet Procol (IP) packet switched access network to select a virtual connection with a selected one of a plurality of Internet Service Providers (ISPs) connected to the Internet, the method comprising:

the user prepending the IP access network address of said selected one of said ISPs to each data packet sent onto the IP access network by said user; and the selected ISP removing said prepended address from each said packet prior to sending said packets onto a selected Internet IP address.

2. A method of transmitting packets across an IP access network from a user to a selected one of a plurality of ISPs connected to the Internet, the method comprising:

accepting from said user of said IP access network data packets prepended with the IP access network address of said selected ISP; and forwarding said packets to said selected ISP.

3. A method of transmitting packets across an IP access network from a selected one of a plurality of ISPS connected to the Internet to a user of said IP access network, the method comprising:

accepting from said selected ISP data packets prepended with the IP access network address of said user; and forwarding said packets to said user.

* * * * *